United States Patent [19]

Suh et al.

[11] 4,174,907
[45] Nov. 20, 1979

[54] FLUID MIXING APPARATUS

[75] Inventors: Nam P. Suh, Sudbury; Christopher A. Rotz, Watertown; Lewis Erwin, II, Belmont; James R. Melcher, Lexington, all of Mass.; James F. Hoburg, Allison Park, Pa.

[73] Assignee: Massachusetts Institute of Technology, Cambridge, Mass.

[21] Appl. No.: 938,817

[22] Filed: Sep. 1, 1978

Related U.S. Application Data

[63] Continuation of Ser. No. 760,170, Jan. 17, 1977, abandoned, which is a continuation of Ser. No. 584,984, Jun. 9, 1975, abandoned.

[51] Int. Cl.$^2$ .............................. B01F 7/24; B01F 7/28
[52] U.S. Cl. ...................................... 366/279; 366/318
[58] Field of Search ............... 366/279, 282, 292, 297, 366/318, 322, 323, 324, 348, 349, 262, 265, 266; 417/49

[56] References Cited

U.S. PATENT DOCUMENTS

| 2,711,436 | 6/1955 | Jones | 366/114 |
|---|---|---|---|
| 2,995,346 | 8/1961 | Samples | 366/98 |
| 3,240,421 | 3/1966 | Farnsworth | 417/49 |
| 3,307,792 | 3/1967 | Hughes | 366/303 |
| 3,343,781 | 9/1967 | Phillips | 417/49 |
| 3,831,907 | 8/1974 | Claes | 366/172 |
| 3,924,836 | 12/1975 | Bruning | 366/76 |

Primary Examiner—Robert W. Jenkins
Attorney, Agent, or Firm—Arthur A. Smith, Jr.; Robert F. O'Connell

[57] ABSTRACT

A fluid mixing apparatus having means for producing vortex-like motions of the fluids introduced therein, one embodiment of such an apparatus, for example, using two concentrically mounted inner and outer members, preferably cylindrical, moveable relative to each other at rotational speeds such as to produce the desired vortex-like motions of the fluids introduced into the region therebetween. In one embodiment thereof, the vortex-like motions may be obtained at relatively low rotational speeds by the use of V-shaped grooves on the inner member. In addition, suitable means can further be used to generate a de-stabilizing force for the fluids in a direction substantially perpendicular to the velocity streamlines thereof to further enhance the mixing effectiveness and to improve the quality of the mix, such de-stabilizing force in one embodiment, for example, being generated by the application of an electric field across the region between the inner and outer members.

25 Claims, 8 Drawing Figures

FIG. 8

FLUID MIXING APPARATUS

This is a continuation of application Ser. No. 760,170, filed Jan. 17, 1977, now abandoned which is in turn a continuation of Ser. No. 584,984, filed June 9, 1975 now abandoned.

INTRODUCTION

This invention relates generally to fluid mixing apparatus and, more particularly, to apparatus for mixing viscous reacting liquids.

BACKGROUND OF THE INVENTION

The effective mixing of two or more fluid components, particularly where one or more of such fluids is relatively highly viscous and reactive, is sometimes difficult to accomplish. For production line operation, as in a molding process, a product mix of suitable quality must be produced at a reasonably fast rate so that the ultimate molded unit can be fabricated at an economically profitable rate. For example, in the mixing of some viscous materials, which react chemically to form a polymer such as polyurethane, the mixing apparatus for use in a molding process, often must be arranged to supply a discrete quantity of a product mix on a discontinuous, or batch, basis, the quality of the mix being required to be sufficiently high that the quality of the molded product is not deleteriously affected.

Moreover, the mixing rate must be high enough so as to provide a good quality of mixing before the reactive fluid compounds undergo a significant amount of reaction in the mixing chamber. It is essential that the mixed liquid remain at a sufficiently low viscosity until the mold is completely filled. Since the ultimately desired physical properties of the mixed material, such as its low-temperature, flexibility and modulus characteristics, depend on the molecular weights of the reacting liquids and thus, on their viscosities, an effective mixing apparatus should not be limited by the viscosity characteristics of the liquid components being mixed.

Further, any production system must be such that the desired production rate should be achieved at a reasonable cost, the size and complexity of the device being such that installation and maintenance expenses can be held to reasonable levels.

A common problem with many continuous and certain batch mixers is that they must be periodically cleaned to prevent an over-accumulation of reacted material from adversely affecting the performance of the apparatus. Often, because of the complicated geometry of the mixer, the cleaning operation must be laboriously performed by hand, the overall costs thereby increasing due both to the additional labor required and to the decreased oproduction which results because of machine down time.

Discussion of the Prior Art

Conventional mixing apparatus usually makes use of rotary blades, spiral ribbons or paddles which mix input liquids in suitable bowl-like or tubular containers. Such systems not only often provide relatively low quality product mixes at low production rates but also the cleaning problems involved are extremely troublesome and increase the costs thereof in production applications.

One mixing apparatus which has been suggested by the prior art for providing more efficient operation has been described in U.S. Pat. No. 3,706,515 issued on Dec. 19, 1972 to Keuerleber et al. Such apparatus represents an attempt to avoid the build-up of reacted material and to increase the batch quantity; i.e., the "shot capacity" of the process. In accordance therewith, each of the liquids is supplied to a high pressure nozzle to form inpinging liquid streams for providing appropriate intermingling thereof so that effective primary mixing is achieved. At the end of each cycle, the material in the mixing chamber is forced out by a moveable ram. A blast of high pressure air is then used to clear out the two nozzles and prevent clogging. Although such a system has a relatively good shot capacity when used in batch processing, the requirement for high pressure equipment makes the system relatively complex and expensive to construct and maintain. Moreover, because the input fluids must be forced under pressure through the nozzles, the apparatus is unable to handle liquids of very high viscosities and, therefore, has a limited range of applications.

Another apparatus of the prior art has been made and sold by USM Corporation and is described in the article "Liquid Injection Molding: Output Control Automation Opens Big Markets" by R.P. Titlebaum, appearing in Plastics Machinery & Equipment Magazine of 1974, additional descriptions of the uses and structures thereof also being found in U.S. Pat. Nos. 3,409,174; 3,448,967; 3,632,022 and 2,794,301. Basically, the apparatus comprises a mixing head which includes a cylindrical chamber having inlet and outlet valves at one end and a moveable ram at the other. Mixing is accomplished by the rotation of an impeller located at the bottom of the chamber. The impeller is rotated at relatively high speeds up to 10,000 to 13,000 r.p.m. and the moveable ram is appropriately raised while the components to be mixed are pumped into the chamber in the proper ratio. When the ram is raised to its maximum height, the outlet valve is opened to permit the injection of mixed material into a mold, and when all of the input components have been pumped into the chamber, the inlet valves are closed and the ram is lowered to force most of the remaining material out of the chamber and into the mold.

In order to reduce the frequency of cleaning thereof, a diluent is added at the beginning of the cycle to retard the chemical reaction. While the USM machine is not limited to low viscosity materials as the impingement mixer in the above discussed Keuerleber patent, the residence time of the input liquids in the mixing chamber is longer than that in the impingement mixer and the production yield is relatively low. Even if one adopts a combined mixing system consisting of the impingement and impeller types, as has been suggested, such a combination unduly complicates the mixing apparatus and does not overcome the basic problems associated with laminer mixing as discussed below.

Other mixing apparatus which might be utilized for two component fluid mixing can be found in U.S. Pat. No. 2,857,144 issued on Oct. 21, 1958 to J. F. Gurley, Jr. et al and variations thereof as shown in U.S. Pat. Nos. 2,969,960; 2,970,817 and 3,420,506 all issued to J. F. Gurley on Jan. 31, 1961, Feb. 7, 1961 and Jan. 7, 1969 respectively. Such structures show conical or cylindrical chambers which use correspondingly shaped rotating inner elements having various forms of projections on the surface thereof, the components to be mixed being introduced in the gap between the outer surface of the inner member and the inner surface of the outer chamber member. The gap therebetween is relatively small in comparison to the radial dimensions of such members and the apparatus would appear to provide relatively low production rates and less effective mixing than may be required in many applications. Moreover, the conically shaped chambers and inner members thereof appear to be particularly difficult to construct so that the costs would appear to be relatively high for some applications. Moreover, while such patents do not discuss the effectiveness of such devices in handling relatively viscous liquids, the small gaps used therein would appear to make the handling thereof relatively difficult.

Most of the mixing devices discussed above accomplish mixing by so-called "laminar" mixing techniques. Laminar mixing occurs when the fluid is so viscous that the Reynolds number characterizing the flow thereof is low. In this case, the mixing of two fluids, for example, is accomplished by subjecting the fluid components to distortional deformation and increasing the interface area of contact between the two fluid components for a given volume thereof. This type of laminar mixing is most efficient when the fluid interface is perpendicular to steamlines of the fluids. However, as the fluids are sheared, the interface therebetween tends to become parallel to the streamlines thereby decreasing the mixing efficiency.

More effective laminar mixing can be promoted by creating vortex-like motions, or secondary flows of the fluids. A careful investigation of the fluid mechanics of many of the prior art devices discussed above shows that the purported operations thereof appear to be contrary to those predicted by theoretical models. Furthermore, regardless of how vortex-like motions are generated, the mixing efficiency per unit power consumed decreases with mixing time because the interface between the fluids tends over the course of time to become parallel to the streamlines. Therefore, a good mixer must be able to generate vortex motions efficiently for good laminar mixing and at the same time must be able to produce an additional fluid motion so as to make the interface become perpendicular to the streamlines.

BRIEF SUMMARY OF THE INVENTION

This invention includes techniques for mechanically generating vortex-like motions of the fluid components to produce good mixing, as well as further techniques for maximizing the efficiency of mechanical mixing by utilizing the instability of fluid motion induced by the generation of a suitable de-stabilizing force, as by the use of an electric field in a manner described in more detail below. Further, the invention can be suitably embodied in apparatus which can accomplish the latter mode of mechanical—electrical hybrid mixing. In accordance with the invention, an effective high quality mixing of multi-component fluids can be provided at relatively low cost, which mixing can be accomplished with a residence mixing time which is shorter than that provided by any presently known commercial processes. Such high quality mixing can be provided at relatively high production rates on a continuous or a batch basis even when used with fluids having very high viscosities. In accordance with one exemplary embodiment, the mixing apparatus of the invention includes an outer cylindrical member and an inner cylindrical member which is concentrically mounted therein. The surface of the inner cylinder may be smooth for ease of cleaning or may have a plurality of V-shaped grooves formed therein. When the inner cylinder is smooth, vortex-like motion is generated when the Taylor number is greater than a critical value, a phenomenon well-known in the field of fluid mechanics. When the inner cylinder is grooved, vortex-motion is substantially immediately generated at much lower rotational velocities than those required for a smooth inner cylinder when the fluids to be mixed are introduced into the region between the V-grooved inner cylinder and the outer cylinders. A relative radial and tangential motion is provided therebetween so that the grooves produce a vortex-like motion of the fluids as they flow along such region.

In a preferred embodiment of the invention using V-shaped grooves, for example, it has been found that a high quality product mix can be achieved at relatively high production rates when the mean distance from the inner surface of the outer cylinder to the surface of the inner cylinder is approximately comparable to the mean radius of the inner cylinder. Further, in a preferred embodiment of the invention, using V-shaped grooves, the quality of product mix can be effectively enhanced when the ratio of the mean distance from the inner surface of the outer cylinder to the surface of the inner cylinder is substantially comparable to the axial length of one groove.

In another preferred embodiment of the invention, it is found that the mixing quality can be even further improved if a suitable de-stabilizing force can be generated for the fluids in a direction which is substantially perpendicular to the velocity stream lines of the fluids. Such a force can be obtained, for example, by the generation of an electric field in the region between the inner and outer cylindrical members which field acting in combination with the vortex-like motions provides an enhanced overall mixing process even when the inner cylindrical member has a relatively smooth, non-grooved surface. In such an embodiment the de-stabilizing force which is thereby generated provides an effective change in the direction of the fluid interface so that it no longer tends to assume a perpendicular orientation with respect thereto.

Thus, the invention provides an apparatus having a relatively high production capacity which is better than most prior art devices described above while at the same time the apparatus is mechanically relatively simple to manufacture and maintain and is capable of handling fluids having a wide range of viscosities.

The invention can be described in greater detail with the held of the accompanying drawings wherein.

Many processes in which the mixing of multiple components is required, such as in polymer processing, utilize the techniques of dispersive mixing wherein both a change in the spatial distribution of the components and a change in the shape and size thereof occurs. In polymer mixing such dispersive mixing can involve the breakdown of the size of polymeric particles (called "intensive" mixing) or can involve the inducing of shear deformation and the increasing of the interfacial area between the multiple components (called "extensive" mixing). The latter technique is often used in the mixing of two liquids which have relatively high viscosities, as in polymer processing, the shearing of the liquid components to maximize the surface-to-volume ratio producing a laminar mixing.

Figure 1:
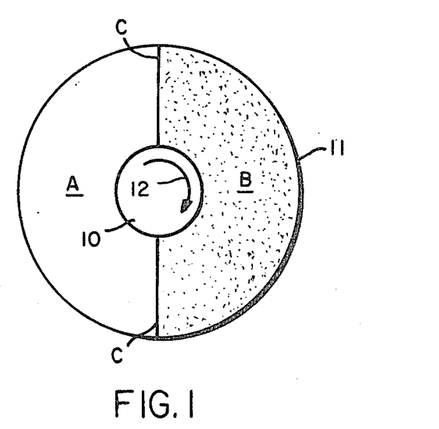
FIG. 1 shows a diagrammatic view of the liquids interface which result when two liquids are introduced into a mixing apparatus.

Thus, as shown for example in the plan, diagrammatic view of FIG. 1, of two defined components "A" and "B" are introduced into the region between an inner cylinder 10 and an outer cylinder 11, as shown, an interface contact area "C" is initially formed therebetween. If the inner cylinder is rotated in the direction, for example, as shown by the arrow 12 in FIG. 2, shear deformation of the liquids occurs and a plurality of laminar layers thereof are generated, as shown, the number of layer increasing as the rotating motion continues. Such motion increases the surface area of contact between the liquids and provides a suitable mixing operation as desired.

In order to maximize the efficiency, the interface between the fluid components should be as perpendicular as possible to the streamlines of fluid motion. However, the nature of fluid motion is such that with increased motion the interface becomes more and more parallel to the streamlines. In order to improve the mixing efficiency, appropriate means are provided for supplying a suitable de-stabilizing force for changing the direction of the interface relative to the velocity streamlines of the fluids so that such direction is brought closer to a direction which is perpendicula to the streamlines.

As used herein, the term "de-stabilizing force" means a force caused by deformations of the fluid materials which in turn tends to cause further deformations thereof so that, in effect, an ever-increasing build-up of deformations occurs. Such a de-stabilizin force can be generated by utilizing an external agent for interacting with a selected property of the fluid materials. So long as the magnitude of the selected property is different for each of fluid materials involved, a de-stabilizing force can be generated. Thus, for example, if the selected property is the electrical conductivity of the fluid materials which are to be mixed, so long as the conductivities of the fluids are different, an electric field applied in the appropriate direction to the fluids will cause the generation of the required de-stabilizing force which will thereupon enhance the overall mixing quality as desired.

Figure 3:
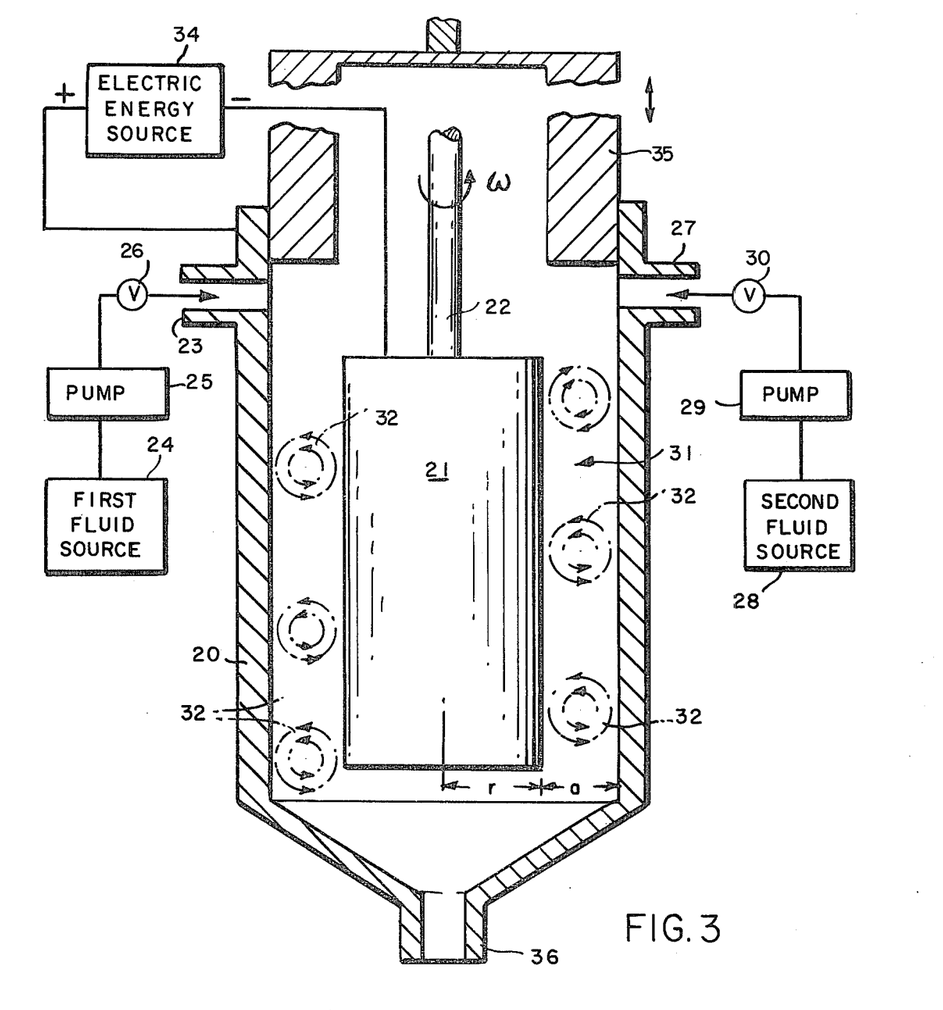
FIG. 3 shows one embodiment of the invention which uses a smooth inner cylindrical member.

In one embodiment of the invention depicted in FIG. 3, an inner cylindrical member 21 is mounted concentrically with respect to an outer cylindrical member 20. Inner member 21 is attached to a rotable shaft 22 so as to rotate at a rotational velocity as shown, by a suitable rotating source, such as a motor (not shown).

A first tubular input feed line 23 extends through the wall of outer cylinder 20 at one end thereof and in turn is connected to a first fluid source 24 via a pump 25 and valve 26. A second tubular input feed line 27 also extends through such wall at the same end as feed line 23 and is connected to a second fluid source 28 via a pump 29 and valve 30. Accordingly, a fluid from such sources is appropriately reduced into the region between the inner wall of outer cylinder 30 and the external surface of inner core cylinder 21.

When the fluid components are introduced at input feed lines 23 and 27, mixing is accomplished by rotation of the inner core member at an appropriate rotational velocity. The radius of the inner core member in the configuration shown in FIG. 1 is designated as r and the gap distance from the inner wall of outer cylinder 20 to the radius is designated as a. If the kinematic viscosities $V_1$ and $V_2$ of the input fluid components are assumed to be substantially the same, as represented by V, the physical process by which the mixing occurs depends on the rotational velocity $\omega$, together with the above parameters in accordance with the value of the Taylor number, as set forth below:

$$\text{Taylor number} = \frac{\omega r a}{V} \left(\frac{a}{r}\right)^{\frac{1}{2}}$$

Figure 2:
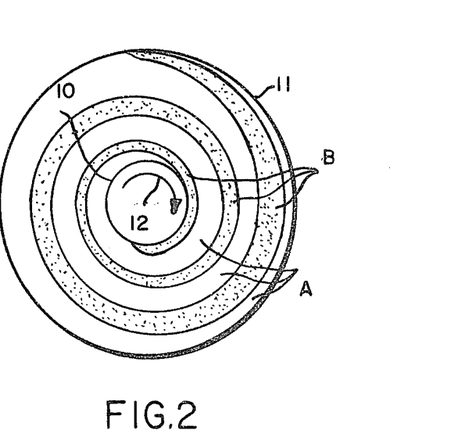
FIG. 2 shows the diagrammatic view of the formation of laminar layers when the liquids of FIG. 2 are mixed.

Mixing is accomplished generally by shear deformation of each of the fluid components which results essentially in the formation of a multi-layered helical sandwich of the fluid components such as shown diagrammatically in FIG. 2. As the rotational velocity increases to a relatively large value, the layers become relatively thin so that diffusion of the components takes place and mixing occurs.

At relatively low velocities, the shear action tends to be non-uniform, that is, the shear action nearer the rotating inner cylinder tends to be better than the shear action nearer the surface of the outer cylinder. In order to provide a more uniform shear action and, hence, a more uniform mixing throughout the entire region between the cylinders, it is desirable to provide a motion of the fluids such that the fluids move in a vortex-like motion between the surfaces as shown by the vortices 32 in FIG. 3. Such motion is effectively produced if the velocity is increased to a value such that the Taylor number exceeds a critical value.

However, even though improvement in mixing uniformity is accomplished by utilizing rotational velocities above a critical Taylor number, the higher velocities tend to produce a fluid interface which, with time, becomes more and more parallel to the velocity streamlines of fluid motion. In order to enhance the mixing process, in accordance with the invention, in appropriate destabilizing force is provided to cause a movement of the interface such that it will move in a direction which tends to be perpendicular to the streamlines. Such a force may be one which acts as a surface force or a body force upon the fluids involved. For example, an electric field which is applied in a direction substantially perpendicular to the velocity streamlines of the fluids can supply such a surface force if the electrical conductivities of the fluids involved are different. Other means can also be used for supplying such forces. For example, with suitable fluids, a magnetic field can be applied in the appropriate direction perpendicular to the streamlines to act upon the magnetic characteristics of the fluids and produce an effective body force thereto if, for example, the permeabilities of the fluids are different.

In the particular exemplary embodiment of the invention, depicted in FIG. 3, such a force is provided by the use of an electric field applied between the inner and outer cylindrical members of the apparatus. While the use of electric fields for aiding a static mixing process has been previously suggested, no one has ye suggested the use thereof in a device which provides vortex-like motions of the fluids involved in a manner such as to create a relatively large number of thin layers of the fluid components to be mixed, such fluids having different conductivities so that application of the electric field generates a de-stabilizing force, as defined above. In providing for such mixing enhancement by the use of an electric field, the device as shown in FIG. 3 has connected to it a source of electrical energy 34 which provides a voltage difference between an outer cylindrical member 20 and an inner cylindrical member 21. The electric field can be in the form of a direct current field supplied by a suitable DC voltage source or in the form of an alternating current field supplied by a suitable AC voltage source. If the property difference being exploited is electrical conductivity, the successful use of an AC voltage source requires that $2\pi f(\epsilon/\sigma) < 1$, where f is the frequency of the AC voltage and the ratio $(\gamma/\sigma)$ is the shorter electrical relaxation time of the two fluids ($\epsilon$ being the permittivity thereof and $\sigma$ being the conductivity thereof). In either case, a marked improvement in the mixing effectiveness of the output product mix is achieved when using concentrically mounted inner and outer cylinders in combination with the application of the electric field as shown in FIG. 3. The voltage level which can be used is essentially limited by the dielectric strengths of the fluid and should be kept at a level below that which would produce dielectric breakdown thereof.

While prior art mixing devices using concentric conical or cylindrical members have generally found it desirable to utilize a relatively small gap region between the inner and outer members, as exemplified by the Gurley and Gurley et al patents discussed above, in accordance with the invention, such gap is made larger than that which has heretofore been used. Thus, if the gap size is determined in accordance with the ratio a/r in the embodiment of the invention shown in FIG. 3, it has been found that good mixing quality has been achieved when such ratio is approximately 0.5 and it is believed that satisfactory results should be obtained when such ratio lies between about 0.2 and 0.8. In such a structure with fluids having kinematic viscosities for example, lying within the range from about 50 to about 6000 centistokes and using rotational velocities within the range from about 10,000 r.p.m. to 15,000 r.p.m. the resulting vortex-like motion of the fluid components produces an effective and high quality mixing thereof.

While a high quality of mixing effectiveness can be achieved when using a smooth surfaced inner cylinder together with an applied electric field, as shown in FIG. 3, the rotational velocities required to achieve the desired vortex-like motion of the fluids for obtaining uniform mixing through region 31 is relatively high. Such motion cannot be achieved unless the critical Taylor number is exceeded as discussed above. It has been found for example, that the vortex-like motion can be achieved when the Taylor number is above about 41.7 for the structure shown in FIG. 3.

Figure 4:
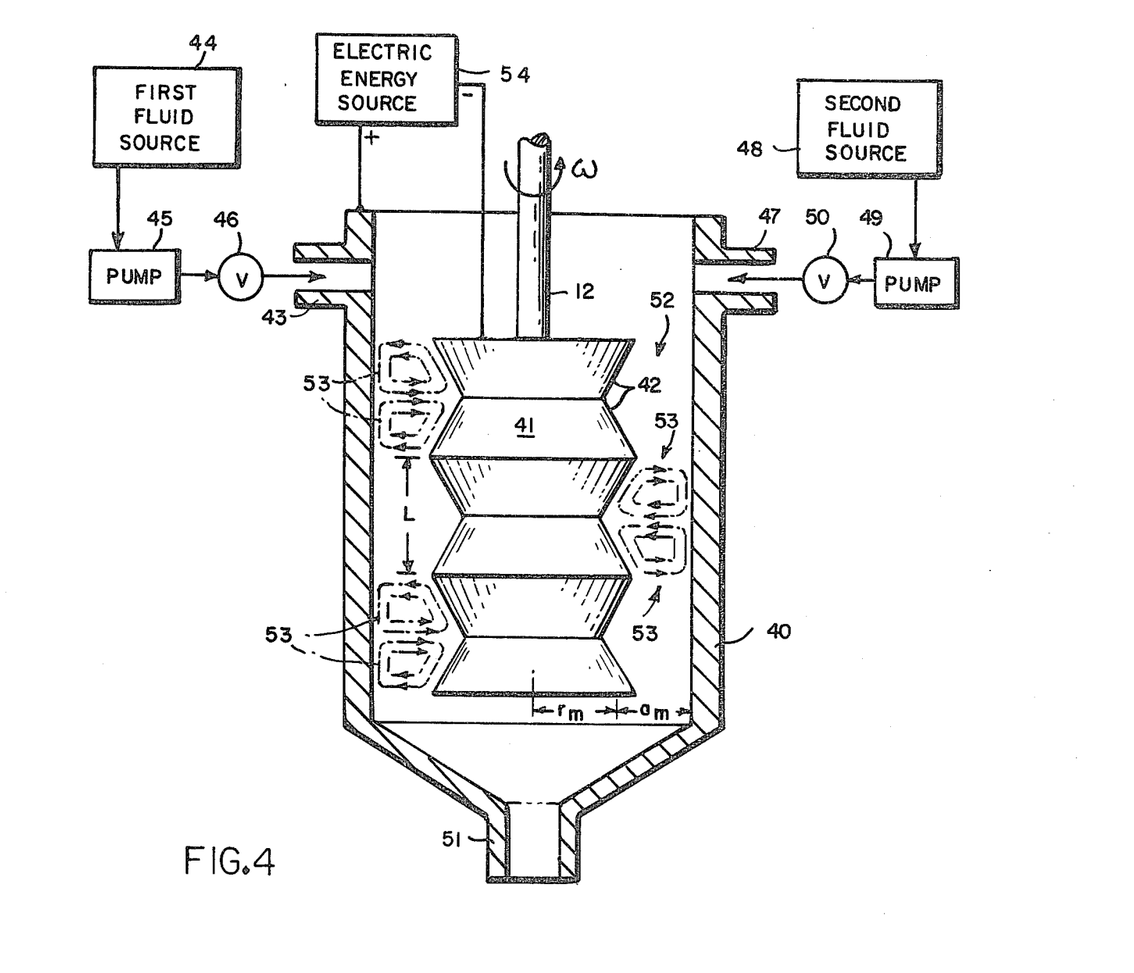
FIG. 4 shows an alternative embodiment of the invention which has a grooved inner cylindrical member.

FIG. 4 shows an alternative embodiment in which the advantages of vortex-like fluid motion can be achieved substantially independently of the value of the Taylor number. The structure therein has an outer cylindrical member 40 and a rotatable inner member 41. The latter member is substantially cylindrical, the surface thereof having a plurality of V-shaped grooves 42 formed thereon substantially along its length. A first input feed line 43 is connected to a first fluid source 44 via pump 45 and valve 46. A second input feed line 47 is connected to a second fluid source 48 via pump 49 and valve 50. An output feed line 52 provides the output product mix.

When the input fluid components are introduced into the region 52 between inner and outer members, mixing is accomplished by rotation of inner member 41. It is found that the presence of V-shaped grooves produces vortex-like motion of the fluids at much lower rotational velocities than that required to produce such motion when using the smooth inner cylinder of FIG. 3. Such vortex-like motion as shown diagrammatically by vortices 53 appears to be produced substantially immediately when the inner member 41 begins its rotation even at start-up when the rotation speeds are just above zero r.p.m.

In order to provide for the most effective formation of such vortex-like motion within the grooves, the mean radius $r_m$ of the inner member, the mean gap dimension $a_m$ and the groove length L, as shown in FIG. 4, can be appropriately selected. As discussed above with the smooth cylinder case, the ratio $a_m/r_m$ preferably should lie in a range from about 0.4 to about 0.6, with a preferred ratio of about 0.5. Further, it has been found generally that in the configuration shown in FIG. 4, a ratio of gap dimension to groove length $(a_m/L)$ of from about 0.3 to about 0.7 is effective, with a preferred value therefor of about 0.5 in order to provide effective vortex-like fluid movement.

The mixing effectiveness of the structure of FIG. 4 is further enhanced by the application of an electric field to produce a de-stabilizing force for the fluids which have differing conductivities in the manner discussed above with reference to FIG. 3. Thus, a source of electric energy 54 provides a voltage difference between the outer member 40 and the inner member 41 which voltage can be either d-c or a-c voltage, as discussed above with reference to FIG. 3. In such case, an effectively high quality of output mix is provided with the use of relative low rotational velocities for fluids having viscosities which can range up to about $10^3$ poise.

Figure 5:
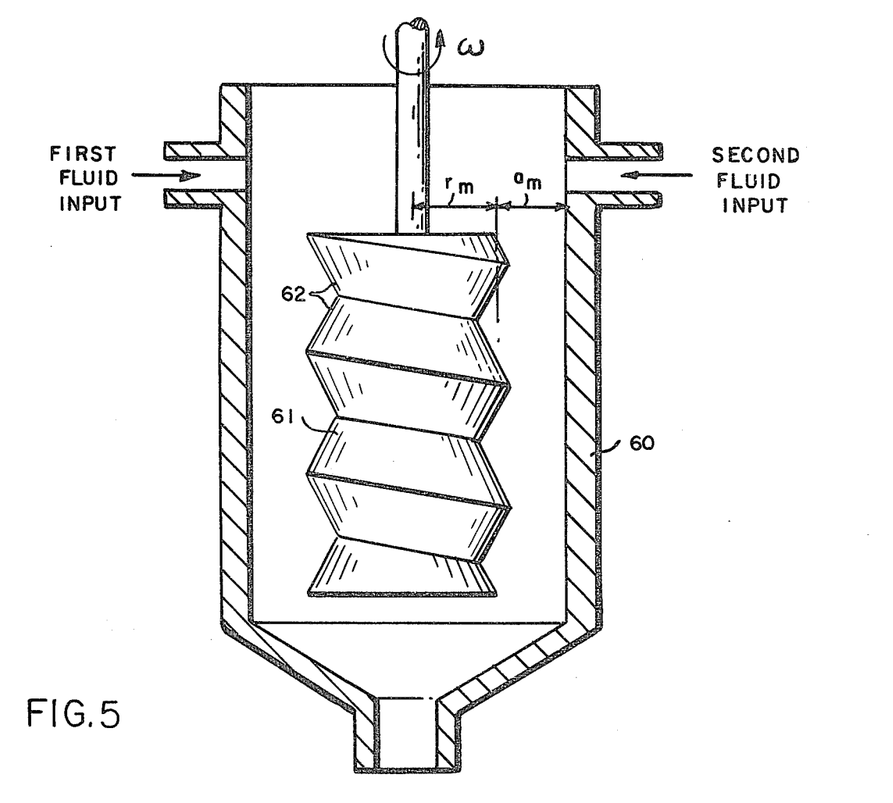
FIG. 5 shows a further alternative embodiment of the structure of FIG. 4 which uses a continuous helical groove on the inner cylindrical member.

An alternative embodiment of the V-shaped construction depicted above is shown in FIG. 5 wherein the V-shaped groove means 62 of inner member 61 is formed as a continuous helical groove extending substantially from one end to the other of inner member 61 which is rotationally mounted within outer member 60. The pitch of the groove may lie within a range from about 0.3 to 0.7 with a pitch of about 0.5 being an effective one. In a manner similar to that provided by the use of the independent V-shaped grooves of FIG. 4, such helical V-shaped groove configuration also provides effective mixing. In using independently formed V-shaped grooves as shown in FIG. 4, the volume flow rate of the output product mix can be set independently of the speed of rotation of the inner member. In contrast thereto, in the helical groove configuration of FIG. 5, the flow rate is dependent upon the speed of rotation and is not set independently thereof. This fact can be used to regulate the flow rate by changing the speed of rotation.

The V-shaped groove configurations discussed above with reference to FIGS. 4 and 5, can be utilized for either batch or continuous product output flow. In the case of a batch process preselected discrete quantities of input fluid components are supplied to the mixing apparatus over a preselected period of time and, accordingly, a preselected discrete quantity of output product mix is supplied at the output feed line thereof on a discontinuous basis. In a continuous process, the inputs are supplied on a continuous basis, the rate of supply of input fluid components and the resultant rate of supply of output product mix being appropriately arranged in accordance with a desired production line application. With a configuration as shown in FIG. 4, for example, for viscous fluids such as polyol and isocyante utilized as the input fluid components thereto, where $r_m$ is about 0.7 in., $a_m$ is about 0.35 in., L is about 0.7 in., and the height h of the cylinder is about 3.5 in., the mixing apparatus of the invention can effectively supply an output product mix as high as about 100 pounds per second.

Figure 6:
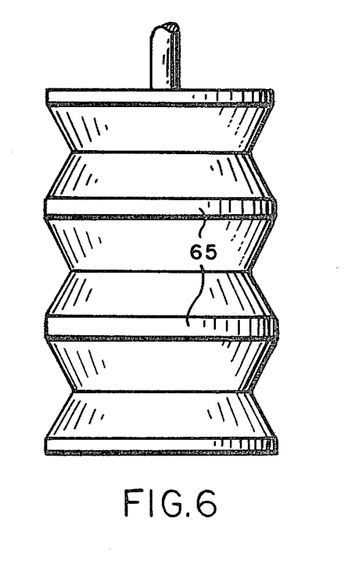
FIG. 6 and 7 show alternative forms of the structures of FIGS. 4 and 5.
Figure 7:
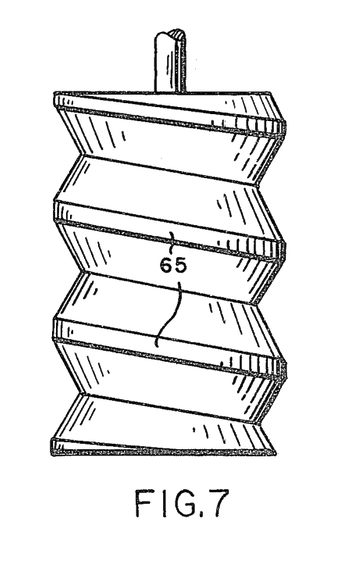

In the use of both independent V-shaped grooves and a continuous helical groove structure, the formation thereof can be modified somewhat as shown in FIGS. 6 and 7. As seen therein, a plurality of lands 65 are formed at the outer edges of each groove. In some applications, the presence of such lands appears to tend to further enhance the mixing process.

Figure 8:
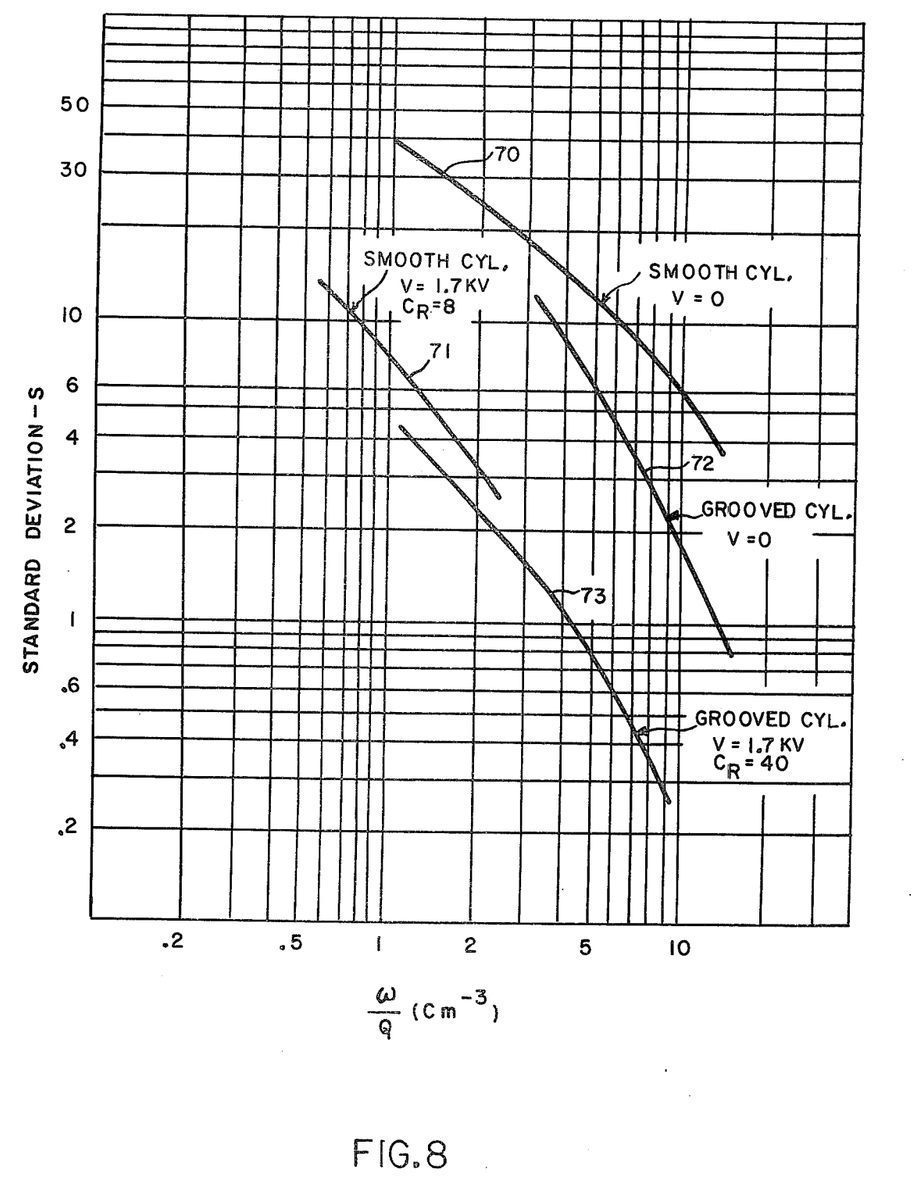
FIG. 8 is a graph illustrating the mixing effectiveness when using mixing apparatus in accordance with various embodiments of the invention.

Examples of the effectiveness of the use of an electric field, with and without the use of a grooved inner member, as well as the effectiveness of using a grooved inner member, with or without the use of an electric field, is graphically depicted in FIG. 8. As seen therein, the standard deviation "S" of the relative concentrations of the two liquids as determined from ten separate 1.0 milliliter samples taken from the mixer outputs is plotted on log-log coordinates against the ratio $\omega/Q$ of the rotational velocity $\omega$ expressed in radians per sec. and the average volume flow rate Q of the liquids being mixed expressed in cubic centimeters per sec. For perfect mixing, the standard derivation S should be zero and, hence, the smaller the value of the ordinate, the better the mixing illustrated thereby.

In all cases, the two liquids mixed with pure glycerine and dyed glycerine; the average viscosities thereof being approximately 400 centipoises. The rotational velocity in each case was maintained at approximately 130 radians per second. In those cases wherein an electric field is used and the conductivities of the fluids are different, the ratio of electrical conductivities of the liquids is identified as "$C_R$" in connection with curves 71 and 73 illustrating such use.

As can be seen in FIG. 8, for a mixing apparatus using a smooth inner cylinder member of the type shown in FIG. 1 with no electric field applied (i.e., the voltage $V=0$) the standard deviation curve is depicted by curve 70. when a voltage V equal to 1.7 KV is applied thereto in a structure of the type depicted in FIG. 1, with liquids having a conductivity ratio $C_R=8$, the mixing quality improved considerably over the range of $\omega/Q$ which was used, as shown by curve 71.

Further, the use of a mixing apparatus having a grooved inner cylinder member of the type depicted in FIG. 4, for example, provided a standard deviation curve as shown by curve 72 when no electric field was applied (i.e., $V=0$). Such a structure also produced a considerable improvement over the use of a smooth inner cylinder member as seen by comparison with curve 70. Moreover, the application of an electric field (by the use of a voltage $V=1.7$ KV) provided substantial improvement over the mixing produced without the use of such field as well as over an apparatus using a smooth inner cylinder, either with or without an electric field, as depicted by the standard derivation curve 73. In the latter case, the ratio of the conductivities $C_R$ was equal to 40.

In the case of the mixing apparatus using a smooth inner cylinder for the results shown by curves 70 and 71, the ratio a/r of the gap "a" between the inner and outer cylinder to the radius "r" of the inner cylinder was set at 0.23. In the cases of the mixing apparatus using a grooved inner cylinder for the resuls shown by curves 72 and 72, the ratio $a_m/r_m$ of the mean gap "a" to the mean radius $r_m$ (see FIG. 4) was set at 0.47 and the ratio $a_m/L$ of the mean gap $a_m$ to the groove length L was set at 0.40, the ratio D/L of the groove depth D to the groove length L was set at 0.42 and the ratio h/L of the total height h of the inner cylinder to the groove length L was set at 5.0.

Although the invention is useful in the mixing of reactive plastic liquid components, such as polyol an isocyanate, the apparatus is not limited to use therewith and other fluid components may be effectively mixed in accordance with the spirit and scope of the invention. Further, while the concentric members are described as cylindrical in shape, other configurations may be utilized, such as substantially spherical or conical concentric members, for example. Further, the vortex-like motion of the fluids may produced by the use of mechanical configurations other than those using concentrically mounted members as specifically discussed herein.

While the particular embodiments shown in the drawings and discussed above represent preferred embodiments of the invention it is clear that further modifications thereof within the spirit and scope of the invention may occur to those skilled in the art. Accordingly, the invention is not to be construed as limited to the specific embodiments shown except as set forth in the appended claims.

What is claimed is:

1. An apparatus for mixing at least two liquids having different electrical conductivities comprising
   means forming a mixing region;
   means for introducing said at least two liquids into said mixing region so as to form an interface region therebetween;
   means for providing relative motions of said liquids in said mixing region;
   means for producing an electrical signal;
   means responsive to said electrical signal producing means for applying said electrical signal across said mixing region to interact with said different electrical conductivities so as to prevent said interface region from becoming aligned with the velocity streamlines of said liquids, said liquids thereby being thoroughly mixed in a substantially laminar fashion in said mixing regions; and
   means for removing the mixture of said liquids from said apparatus.

2. A mixing apparatus in accordance with claim 1, the means forming said mixing region comprising
   an outer member; and an inner member mounted for rotation within said outer member so that said mixing region is formed therebetween; and means for providing a relative rotation between said inner and outer members at relative rotational velocities sufficient to produce vortex-like motions of said liquids.

3. A mixing apparatus in accordance with claim 2 wherein said outer and inner members are substantially cylindrical and the surface of said inner cylindrical member is substantially smooth.

4. A mixing apparatus in accordance with claim 3 wherein said liquids have viscosities lying within a range from about 50 to about 6000 centistokes.

5. A mixing apparatus in accordance with claim 4 wherein said liquids are liquid plastic resin materials.

6. A mixing apparatus in accordance with claim 5 wherein two liquid plastic resins are mixed, a first plastic resin being polyol and a second plastic resin being isocyanate.

7. A mixing apparatus in accordance with claim 3 wherein the ratio a/r, lies within a range from about 0.2 to about 0.8 and further wherein "r" is defined as the radius of the inner cylindrical member and "a" is defined as the radius of the inner cylindrical member and "a" is defined as the distance from said radius to the inner surface of said outer cylindrical member.

8. A mixing apparatus in accordance with claim 7 wherein said ratio a/r is about 0.5.

9. A mixing apparatus in accordance with claim 3 wherein said electrical field is supplied by a voltage source which produces a voltage difference between the outer cylindrical member and the inner cylindrical member.

10. A mixing apparatus in accordance with claim 9 wherein said voltage source is a d-c voltage source.

11. A mixing apparatus in accordance with claim 9 wherein said voltage source is an a-c voltage source.

12. A mixing apparatus in accordance with claim 9 wherein the voltage level of said voltage source is below a voltage level which would produce dielectric breakdown of the liquids being mixed.

13. An apparatus for mixing at least two liquids having different electrical conductivities comprising
an outer member;
an inner member concentrically mounted for rotation within said outer member;
means for introducing said at least two liquids into a mixing region between said inner and outer members so as to form an interface region therebetween;
means for providing a relative rotation between said inner and outer members;
V-shaped groove means formed on the surface of said inner member for producing vortex-like motions of said liquids in said mixing region as formed by said groove means when said relative rotation is provided;
means for providing an electrical signal;
means responsive to said electrical signal producing means for applying said electrical signal across said mixing region to produce an electric field across said mixing region the interaction of said electric field with said different electrical conductivities and the presence of said groove means preventing said interface region from becoming aligned with the velocity streamlines of said liquids, said liquids thereby being thoroughly mixed in a substantially laminar fashion in said mixing region; and
means for removing the mixture of said liquids from said apparatus.

14. A mixing apparatus in accordance with claim 13 wherein said outer and inner members are substantially cylindrical.

15. A mixing apparatus in accordance with claim 14 wherein said groove means comprises a plurality of independent V-shaped grooves, said vortex-like motions being provided in association with each of said V-shaped grooves.

16. A mixing apparatus in accordance with claim 15 wherein said electric field is supplied by a voltage source which produces a voltage difference between the outer cylindrical member and the inner cylindrical member.

17. A mixing apparatus in accordance with claim 16 wherein the voltage level of said voltage source is below a voltage level which would produce dielectric breakdown of the liquids being mixed.

18. A mixing apparatus in accordance with claim 17 wherein said voltage source is a d-c voltage source.

19. A mixing apparatus in accordance with claim 17 wherein said voltage source is an a-c voltage source.

20. A mixing apparatus in accordance with claim 19 wherein said groove means comprise a continuous helical V-shaped groove extending substantially along the length of said inner cylindrical member.

21. A mixing apparatus in accordance with claim 20 wherein said electric field is supplied by a voltage source which produces a voltage difference between the outer cylindrical member and the inner cylindrical member.

22. A mixing apparatus in accordance with claim 21 wherein the voltage level of said voltage source is below a voltage level which would produce dielectric breakdown of the liquids being mixed.

23. A mixing apparatus in accordance with claim 22 wherein said voltage source is a d-c voltage source.

24. A mixing apparatus in accordance with claim 22 wherein said voltage source is an a-c voltage source.

25. An apparatus for mixing at least two liquids having different electrical conductivities comprising
means for introducing said at least two liquids into said apparatus so as to form an interface region therebetween;
means forming a part of said apparatus for causing vortex-like motions of said liquids in said apparatus;
means for providing an electrical signal;
means responsive to said electrical signal producing means for applying said electrical signal to said apparatus to produce an electric field across the interface region between the liquids in said apparatus to interact with said different electrical conductivities so as to prevent said interface region from becoming aligned with the velocity streamlines of said liquids, said liquids thereby being thoroughly mixed in a substantially laminar fashion in said apparatus; and
means for removing the mixture of said liquids from said apparatus.

* * * * *

UNITED STATES PATENT AND TRADEMARK OFFICE
CERTIFICATE OF CORRECTION

PATENT NO. : 4,174,907
DATED : November 20, 1979
INVENTOR(S) : Nam P. Suh et al.

It is certified that error appears in the above-identified patent and that said Letters Patent are hereby corrected as shown below:

After the last line of the Abstract, insert the following paragraph:

--The Government has rights in this invention pursuant to Grant No. DI-38249 awarded by the National Science Foundation.--

Signed and Sealed this

Eighteenth Day of March 1980

[SEAL]

Attest:

SIDNEY A. DIAMOND

Attesting Officer

Commissioner of Patents and Trademarks